United States Patent
Ishikawa

(10) Patent No.: US 11,507,744 B2
(45) Date of Patent: Nov. 22, 2022

(54) INFORMATION PROCESSING APPARATUS, INFORMATION PROCESSING METHOD, AND COMPUTER-READABLE RECORDING MEDIUM

(71) Applicant: NEC Corporation, Tokyo (JP)

(72) Inventor: Kai Ishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 302 days.

(21) Appl. No.: 16/761,318

(22) PCT Filed: Nov. 10, 2017

(86) PCT No.: PCT/JP2017/040665
§ 371 (c)(1),
(2) Date: May 4, 2020

(87) PCT Pub. No.: WO2019/092868
PCT Pub. Date: May 16, 2019

(65) Prior Publication Data
US 2021/0192137 A1 Jun. 24, 2021

(51) Int. Cl.
*G06F 40/237* (2020.01)
*G06F 40/284* (2020.01)
(Continued)

(52) U.S. Cl.
CPC .......... *G06F 40/237* (2020.01); *G06F 40/284* (2020.01); *G06F 40/289* (2020.01);
(Continued)

(58) Field of Classification Search
CPC .... G06F 40/237; G06F 40/284; G06F 40/289; G06F 40/30; G06F 17/16; G06F 16/345;
(Continued)

(56) References Cited

U.S. PATENT DOCUMENTS

2015/0186790 A1* 7/2015 Ehlen ................... G06Q 30/02
707/750

FOREIGN PATENT DOCUMENTS

EP          3173983 A1     5/2017
WO   WO-2011030752 A1 *  3/2011  ......... G06F 17/2715

OTHER PUBLICATIONS

Abdolahi et al, Sentence Matrix Normalization Using Most Likely n-grams Vector, 2017 IEEE 4th International Conference on Knowledge-Based Engineering and Innovation (KBEI) Dec. 22, 2017, pp. 40-45 (Year: 2017).*

(Continued)

*Primary Examiner* — Linda Wong
(74) *Attorney, Agent, or Firm* — Sughrue Mion, PLLC

(57) ABSTRACT

An information processing apparatus includes a lexical analysis unit that generates a training word string, a pair generation unit that generates a plurality of training word pairs, a matrix generation unit that generates, for each training word pair, a training matrix in which a plurality of words and respective semantic vectors of the words are associated, a classification unit that calculates, for a word of each position of the training word string, a probability of the word corresponding to a specific word, using the training matrices generated by the matrix generation unit and a determination model that uses a convolutional neural network, and an optimization processing unit that updates parameters of the determination model, such that the probability of the word labeled as corresponding to the specific word is high, among the probabilities of the words of the respective positions of the training word string calculated by the classification unit.

12 Claims, 19 Drawing Sheets

(51) Int. Cl.
 G06F 40/289 (2020.01)
 G06F 40/30 (2020.01)
 G06N 3/04 (2006.01)
 G06F 17/16 (2006.01)

(52) U.S. Cl.
 CPC ............... *G06F 40/30* (2020.01); *G06N 3/04* (2013.01); *G06F 17/16* (2013.01)

(58) Field of Classification Search
 CPC .... G06F 40/274; G06F 16/3344; G06F 16/35; G06F 16/24578; G06F 16/285; G06F 16/3347; G06F 16/355; G06F 16/3329; G06F 16/906; G06N 3/04; G06N 3/0454; G06N 3/08; G06N 3/0445; G06N 20/00; G06N 5/00; G06K 9/6223; G10L 15/1815; G10L 15/1822; G10L 15/18; G10L 2015/088; G10L 15/10
 See application file for complete search history.

(56) References Cited

OTHER PUBLICATIONS

Kim Yoon, Convolutional Neural Networks for Sentence Classification, Proceedings of the 2014 on Empirical Methods in Natural Language Processing (EMNLP), pp. 1746-1751, Oct. 25-29, 2014 (Year: 2014).*

International Search Report for PCT Application No. PCT/JP2017/040665, dated Feb. 13, 2018.

Y. Kim, 2014 "Convolutional Neural Networks for Sentence Classification" EMNLP 2014, Oct. 25, 2014, pp. 1746-1751, USA.

Yin, W.P. and Schutze, H., "Multichannel variable-size convolution for sentence classification", arXiv preprint, Mar. 15, 2016, arXiv: 1603.04513,[retrieved on : Feb. 5, 2018], Germany Internet:<URL:https://arxiv.org/abs/1603.04513>.

Wang, P. et al., "Semantic clustering and convolutional neural network for short text categorization", Proceedings of the 53rd Annual Meeting of the Association for Computational Linguistics, 2015, pp. 352-357, [retrieved on: Feb. 5, 2018], China Internet:<URL:https://www.semanticscholar.org/paper/Semantic-Clustering-and Convolutional-Neural-Netwo-Wang-Xu/893c2f504877e4878b93f5f7b907ae497f95e3db>.

Zumi, Masataka, Miura, Takao, Boosting based age estimation of Blog authors, The First Forum on Data Engineering and Information Management—DEIM Forum—Proceedings. Japan 2009.

English translation of Written opinion for PCT Application No. PCT/JP2017/040665, dated Feb. 13, 2018.

* cited by examiner

Fig.3
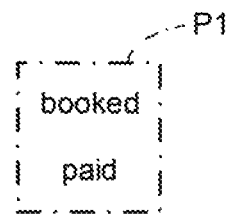
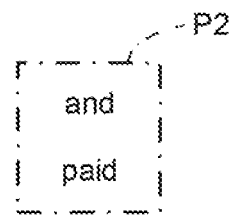
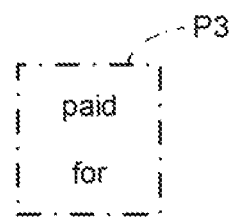
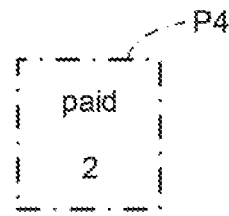

Fig.4
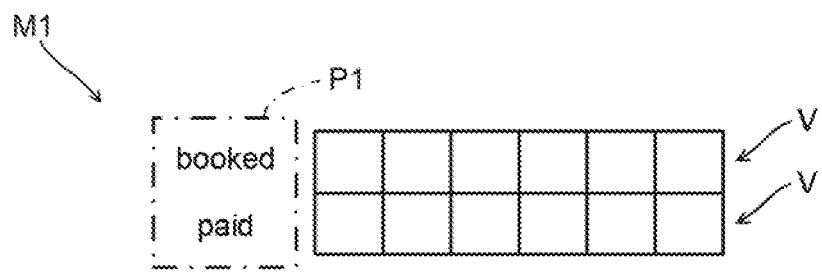
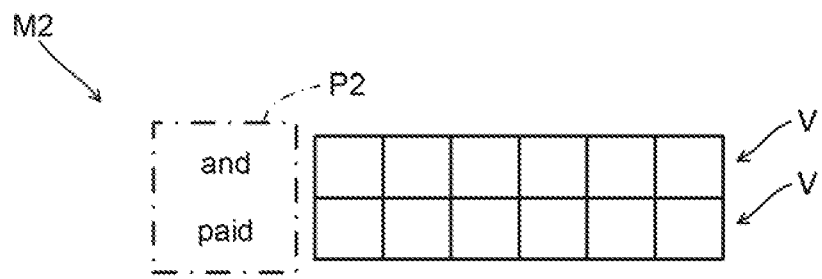
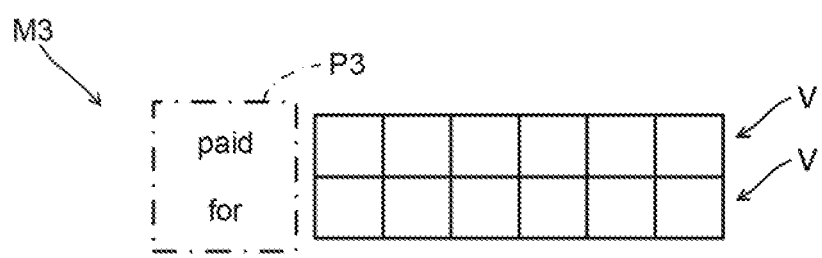
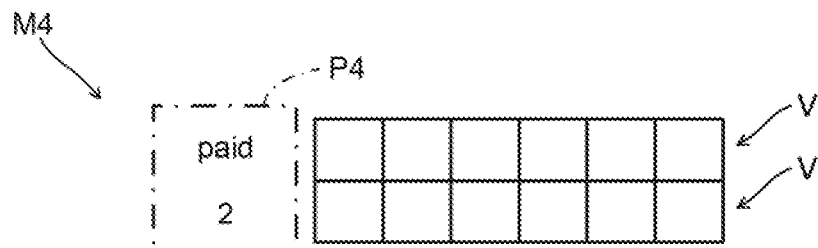

Fig.9

| WORD PAIR | NEGATIVE EXAMPLE COUNT | POSITIVE EXAMPLE COUNT |
|---|---|---|
| was and | 2 | 0 |
| booked and | 2 | 0 |
| and paid | 1 | 1 |
| and for | 2 | 0 |
| booked paid | 1 | 1 |
| paid for | 1 | 1 |
| paid 2 | 1 | 1 |

Fig.10

| WORD PAIR | NEGATIVE EXAMPLE COUNT | POSITIVE EXAMPLE COUNT |
|---|---|---|
| was and | 2 | 0 |
| booked and | 2 | 0 |
| and paid | 1 | 1 |
| and for | 2 | 0 |
| TOTAL | 7 | 1 |

Fig.11

| WORD PAIR | NEGATIVE EXAMPLE COUNT | POSITIVE EXAMPLE COUNT |
|---|---|---|
| booked paid | 1 | 1 |
| and paid | 1 | 1 |
| paid for | 1 | 1 |
| paid 2 | 1 | 1 |
| TOTAL | 4 | 4 |

Fig.16
PRIOR ART

··· location was booked and paid for 2 months ago ···

INFORMATION PROCESSING APPARATUS, INFORMATION PROCESSING METHOD, AND COMPUTER-READABLE RECORDING MEDIUM

CROSS REFERENCE TO RELATED APPLICATIONS

This application is a National Stage Entry of PCT/JP2017/040665 filed on Nov. 10, 2017, the contents of all of which are incorporated herein by reference, in their entirety.

TECHNICAL FIELD

The present invention relates to an information processing apparatus, an information processing method, and a computer-readable recording medium that includes a program recorded thereon for realizing the apparatus and method.

BACKGROUND ART

In recent years, development of systems that extract words relating to specific event information from a provided text has been ongoing.

For example, Non-Patent Document 1 discloses a method of extracting a word (hereinafter, referred to as a specific word) relating to specific event information from a provided text, with a system utilizing a convolutional neural network (hereinafter, also referred to as a CNN).

FIG. 15 is a block diagram showing a configuration of an extraction apparatus that utilizes the method of Non-Patent Document 1. An extraction apparatus 100 shown in FIG. 15 is provided with a lexical analysis unit 101, an encoder 102, a classification unit 103, and an optimization processing unit 104. In the extraction apparatus 100, the classification unit 103 extracts a specific word from a provided text (hereinafter, referred to as an analysis text), with a determination model learned using training texts.

FIG. 16 is a diagram showing part of a training text. When learning a determination model in the extraction apparatus 100, first, a training text and position information indicating the position of the specific word in the training text are input to the lexical analysis unit 101. Specifically, in the case where, for example, "transfer money" is provided as the specific event information and "paid" is provided as the specific word, the position of "paid" in the training text is input to the lexical analysis unit 101 together with the training text. The lexical analysis unit 101 generates a word string such as shown in FIG. 17, by performing lexical analysis of the input training text.

The encoder 102 extracts a plurality of words from the word string generated by the lexical analysis unit 101, using a window W of a predetermined length L centering on a word 105 targeted for detection. More specifically, the lexical analysis unit 101 generates a plurality of word groups, by extracting a plurality of words in each position, while shifting the position of the window W.

Also, the encoder 102 generates a plurality of matrices corresponding to the plurality of word groups. FIG. 18 is a diagram showing an example of a matrix that is generated by the encoder 102. Note that FIG. 18 shows a matrix corresponding to a word group constituted by "was, booked, and, paid, for". Referring to FIG. 18, the encoder 102, by associating semantic vectors generated using a dictionary model with the plurality of words of each word group, generates a matrix in which the plurality of words and respective semantic vectors of the plurality of words are associated, for every word group. Note that, in FIG. 18, the portion representing the semantic vector of "was" is enclosed by a dashed-dotted line.

The classification unit 103 determines whether the word of each position of the word string (refer to FIG. 17) corresponds to the specific word, using the matrices generated by the encoder 102 and a determination model that uses a CNN. In other words, the classification unit 103 specifies the position of the specific word in the training text.

The optimization processing unit 104 updates parameters of the determination model, based on the determination result of the classification unit 103 and the actual position of the specific word in the training text. The determination model is thus learned in the extraction apparatus 100. When an analysis text is provided to the lexical analysis unit 101 after the determination model is learned, matrices are generated in the above manner by the encoder 102, and the specific word is extracted by the classification unit 103, using the generated matrices and the learned determination model.

LIST OF RELATED ART DOCUMENTS

Non-Patent Document

Non-Patent Document 1: Y. Kim, 2014 "Convolutional Neural Networks for Sentence Classification" EMNLP 2014, Oct. 25, 2014, pp. 1746-1751

SUMMARY OF INVENTION

Problems to be Solved by the Invention

With the abovementioned extraction apparatus 100 that utilizes the method disclosed in Non-Patent Document 1, the surrounding context of the word targeted for detection can be taken into consideration, by increasing the length of the window W and extracting a plurality of words. The ambiguity of meaning inherent in the word targeted for detection is thereby resolved, and it can be determined whether the word targeted for detection corresponds to the specific word. However, as a result of investigations by the inventor of the present invention, it was revealed that the specific accuracy of the position of the specific word in the text may decrease, due to increasing the length of the window W.

An example object of the invention is to provide an information processing apparatus, an information processing method and a computer-readable recording medium that are able to accurately extract a word relating to specific event information from a provided text.

Means for Solving the Problems

An information processing apparatus according to an example aspect of the invention includes:

a lexical analysis circuit configured to acquire a training text and position information indicating a position, in the training text, of a word relating to specific event information, and generate a training word string given, for every word, position information indicating a position of the word in the training text and a label indicating whether the word corresponds to the word relating to the event information, by performing lexical analysis of the training text;

a pair generation circuit configured, while shifting, one word at a time from a head to an end of the training word string generated by the lexical analysis circuit, a position of a window of a predetermined length centering on a word targeted for detection, in the training word string, to extract a plurality of training word pairs obtained by respectively combining each word other than the word targeted for detection within the window in each position with the word targeted for detection;

a matrix generation circuit configured, by associating a semantic vector of each of the plurality of words of the training word string, generated using a dictionary model set in advance, with each word of the plurality of training word pairs, to generate, for each of the plurality of training word pairs, a training matrix in which each word and the semantic vector of the word are associated;

a classification circuit configured to calculate, for a word of each position of the training word string, a probability of the word corresponding to the word relating to the specific event information, using the plurality of training matrices generated by the matrix generation circuit and a determination model that uses a convolutional neural network; and an optimization processing circuit configured, the probability being included in a plurality of probabilities, to update a parameter of the determination model, such that the probability of the word labeled as corresponding to the word relating to the event information is high, among the plurality of probabilities of words of the respective positions of the training word string calculated by the classification circuit.

Also, an information processing method according to an example aspect of the invention includes:

acquiring a training text and position information indicating a position, in the training text, of a word relating to specific event information, and generating a training word string given, for every word, position information indicating a position of the word in the training text and a label indicating whether the word corresponds to the word relating to the event information, by performing lexical analysis of the training text;

extracting a plurality of training word pairs obtained by respectively combining each word other than the word targeted for detection with the word targeted for detection within a window of a predetermined length centering on a word targeted for detection in each position, while shifting, one word at a time from a head to an end of the training word string, a position of the window, in the training word string;

generating, for each of the plurality of training word pairs, a plurality of training matrices in which each word and a semantic vector of the word are associated, by associating the semantic vector of each of a plurality of words of the training word string, generated using a dictionary model set in advance, with each word of the plurality of training word pairs;

calculating, for a word of each position of the training word string, a probability of the word corresponding to the word relating to the specific event information, using the plurality of training matrices and a determination model that uses a convolutional neural network; and updating, the probability being included in a plurality of probabilities, a parameter of the determination model, such that the probability of the word labeled as corresponding to the word relating to the event information is high, among the plurality of probabilities of words of the respective positions of the training word string.

Furthermore, a non-transitory computer-readable recording medium according to an example aspect of the invention includes a program recorded thereon, the program including instructions that cause the computer to carry out:

acquiring a training text and position information indicating a position, in the training text, of a word relating to specific event information, and generating a training word string given, for every word, position information indicating a position of the word in the training text and a label indicating whether the word corresponds to the word relating to the event information, by performing lexical analysis of the training text;

extracting a plurality of training word pairs obtained by respectively combining each word other than the word targeted for detection with the word targeted for detection within a window of a predetermined length centering on a word targeted for detection in each position, while shifting, one word at a time from a head to an end of the training word string, a position of the window, in the training word string;

generating, for each of the plurality of training word pairs, a plurality of training matrices in which each word and a semantic vector of the word are associated, by associating the semantic vector of each of a plurality of words of the training word string, generated using a dictionary model set in advance, with each word of the plurality of training word pairs;

calculating, for a word of each position of the training word string, a probability of the word corresponding to the word relating to the specific event information, using the plurality of training matrices and a determination model that uses a convolutional neural network; and updating, the probability being included in a plurality of probabilities, a parameter of the determination model, such that the probability of the word labeled as corresponding to the word relating to the event information is high, among the plurality of probabilities of words of the respective positions of the training word string.

Advantageous Effects of the Invention

As described above, according to the invention, a word relating to specific event information can be accurately extracted from a provided text.

BRIEF DESCRIPTION OF THE DRAWINGS

FIG. 3 is a diagram showing four training word pairs extracted by the pair generation unit, in the position of the window shown in FIG. 2.

FIG. 4 is a schematic view showing training matrices.

FIG. 9 is a diagram showing a positive example count and a negative example count of word pairs.

FIG. 10 is a diagram showing a positive example count and a negative example count of word pairs.

FIG. 11 is a diagram showing a positive example count and a negative example count of word pairs.

FIG. 16 is a diagram showing part of a training text.

EXAMPLE EMBODIMENTS

Example Embodiment

Hereinafter, an information processing apparatus, an information processing method and a program according to an example embodiment of the invention will be described, with reference to FIGS. 1 to 19.

[Apparatus Configuration]

Figure 1:
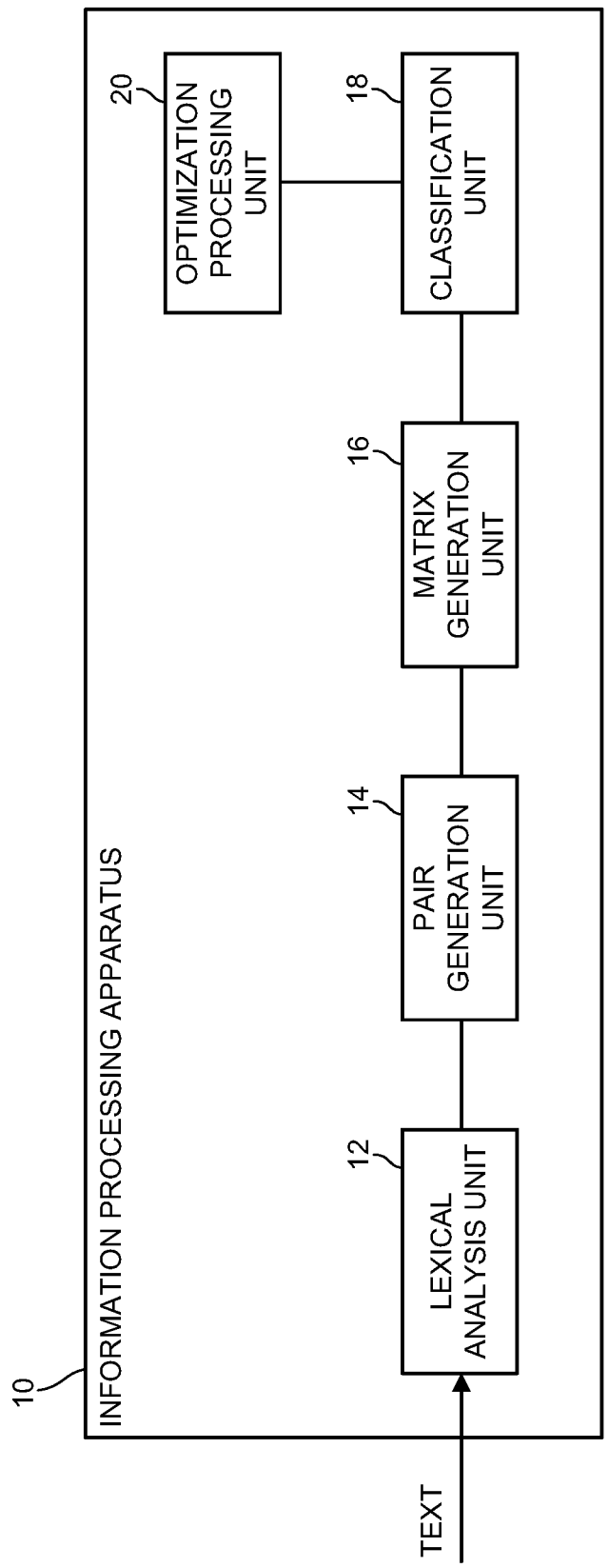
FIG. 1 is a configuration diagram showing a schematic configuration of an information processing apparatus according to an example embodiment of the invention.

Initially, a configuration of the information processing apparatus according to the example embodiment of the invention will be described. FIG. 1 is a configuration diagram showing a schematic configuration of the information processing apparatus according to the example embodiment of the invention.

As shown in FIG. 1, the information processing apparatus 10 according to the example embodiment is provided with a lexical analysis unit 12, a pair generation unit 14, a matrix generation unit 16, a classification unit 18, and an optimization processing unit 20. In the information processing apparatus 10 according to the example embodiment, a determination model discussed later is learned, using training texts.

Specifically, first, a training text (e.g., refer to FIG. 16) and position information indicating a position, in the training text, of a word (hereinafter, referred to as a specific word) relating to specific event information are input to the lexical analysis unit 12. In the example embodiment, in the case where, for example, "transfer money" is provided as the specific event information and "paid" is provided as the specific word, position information indicating the position of "paid" in the training text is input to the lexical analysis unit 12 together with the training text. Note that, in the example embodiment, position information is a numerical value (offset) indicating a description region of a given word in a text, and is represented by an integer indicating a distance from the head of the text, for example.

Figure 17:
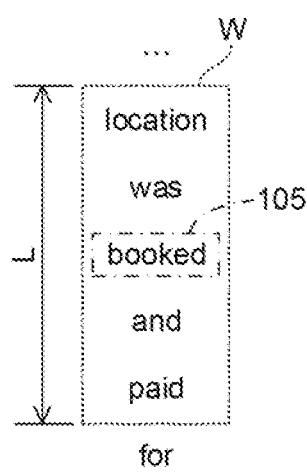
FIG. 17 is a diagram showing a word string.
Figure 18:
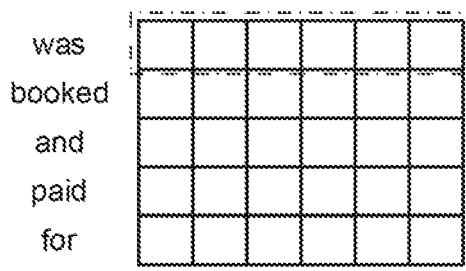
FIG. 18 is a diagram showing an example of a matrix generated by an encoder.

In the example embodiment, the lexical analysis unit 12 generates a word string (hereinafter, referred to as a training word string) such as shown in FIG. 17, by performing lexical analysis of the input training text. Note that, in the example embodiment, each word of the training word string generated by the lexical analysis unit 12 is assigned position information indicating the position of the word in the training text and a label indicating whether the word corresponds to the specific word. In the example embodiment, each word is assigned one of two values (0 or 1), for example. In the example shown in FIG. 17, "paid", which is the specific word, is assigned a label (e.g., 1) indicating that the word corresponds to the specific word, and words other than "paid" are assigned a label (e.g., 0) indicating that the word is not the specific word, for example. Note that, in the example embodiment, even a word that is the same word as the specific word may not correspond to the specific word, depending on the position of the word in the training text. In other words, even in the case where the same word appears in two positions in the training text, one of the words may correspond to the specific word and the other of the words may not correspond to the specific word, depending on the surrounding context of that word. In this case, the label indicating that the word is not the specific word is assigned to the word that does not correspond to the specific word.

The pair generation unit 14 extracts a training word pair from the plurality of words within the window in each position, while shifting the position a window of a predetermined length centering on a word targeted for detection (hereinafter, also referred to as a detection word), one word at a time from the head to the end of the training word string. Specifically, the pair generation unit 14 extracts a plurality of training word pairs, by combining each word other than the detection word within the window with the detection word.

Figure 2:
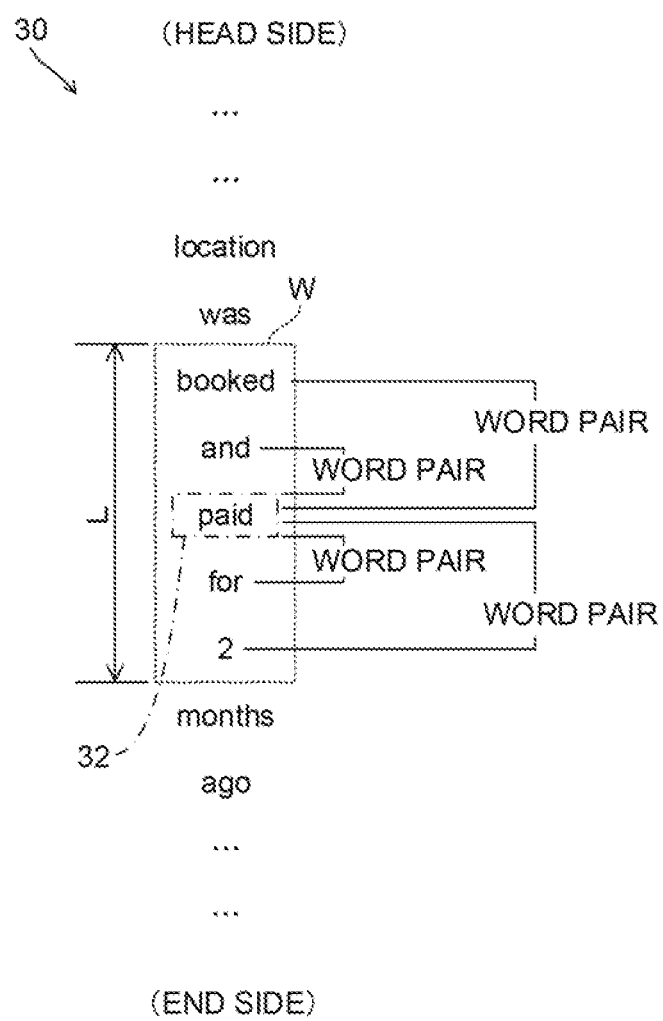
FIG. 2 is a diagram showing an example of the relationship between part of a training word string generated by a lexical analysis unit and training word pairs that are extracted by a pair generation unit.

FIG. 2 is a diagram showing an example of the relationship between part of a training word string generated by the lexical analysis unit 12 and training word pairs that are extracted by the pair generation unit 14. Also, FIG. 3 is a diagram showing four training word pairs extracted by the pair generation unit 14, in the position of the window W shown in FIG. 2.

In the example shown in FIGS. 2 and 3, the pair generation unit 14 extracts the four training word pairs P1 to P4 within the window W, by respectively combining each word (booked, and, for, 2) other than the detection word 32 with the detection word 32. Note that, in the example embodiment, the length of the window is shown by a word count. In the example in FIG. 2, the length L of the window is 5. Note that, in the example embodiment, the length of a window is set to an odd number of 5 or more. Accordingly, the length of the window may be an odd number of 7 or more.

The matrix generation unit 16, as shown in FIG. 4, generates training matrices M1 to M4, by associating each word of the plurality of training word pairs P1 to P4 generated by the pair generation unit 14 with a semantic vector V of the word. Note that the training word pairs P1 to P4 shown in FIG. 4 are training word pairs generated with the window W in the position shown in FIG. 2. In the example embodiment, the matrix generation unit 16 generates training matrices for all the training word pairs generated by the pair generation unit 14. Also, the training matrices M1 to M4 shown in FIG. 4 are schematic views, and the semantic vector of each word is represented by 300 dimensions, for example.

In the example embodiment, the matrix generation unit 16 acquires the semantic vector of each word of the training word string 30, using a dictionary model set in advance, for example. The matrix generation unit 16 is then able to generate the plurality of training matrices M1 to M4, by associating the acquired semantic vector V of each word with each word of the plurality of training word pairs P1 to P4 generated by the pair generation unit 14. Note that the matrix generation unit 16 may associate a semantic vector V with each of the plurality of words of the training word string 30, before the plurality of training word pairs P1 to P4 are generated by the pair generation unit 14. In this case, the pair generation unit 14 may generate the training word pairs P1 to P4 from the training word string 30 whose every word is associated with a semantic vector V. A known model such as Word2vec can be utilized as the dictionary model.

The classification unit 18 calculates, for a word of each position of the training word string 30, the probability of the word corresponding to the specific word, using the plurality of training matrices M1 to M4 generated by the pair generation unit 14 and a determination model built in advance using a convolutional neural network (CNN).

The optimization processing unit 20 updates the parameters of the determination model, such that the probability of the word labeled as corresponding to the specific word is high, among the probabilities of the words of the respective positions of the training word string 30 calculated by the classification unit 18.

As mentioned above, in the example embodiment, a plurality of training word pairs are generated, for every word targeted for detection. Training matrices are then generated from each of the plurality of training word pairs. That is, in the example embodiment, a plurality of training matrices are generated, for every word targeted for detection. In the example embodiment, a determination model that uses a CNN can be learned, using the plurality of training matrices generated in this way. The determination model can thereby be learned, such that the specific word can be accurately extracted from a provided text, as will be discussed in detail later.

Figure 5:
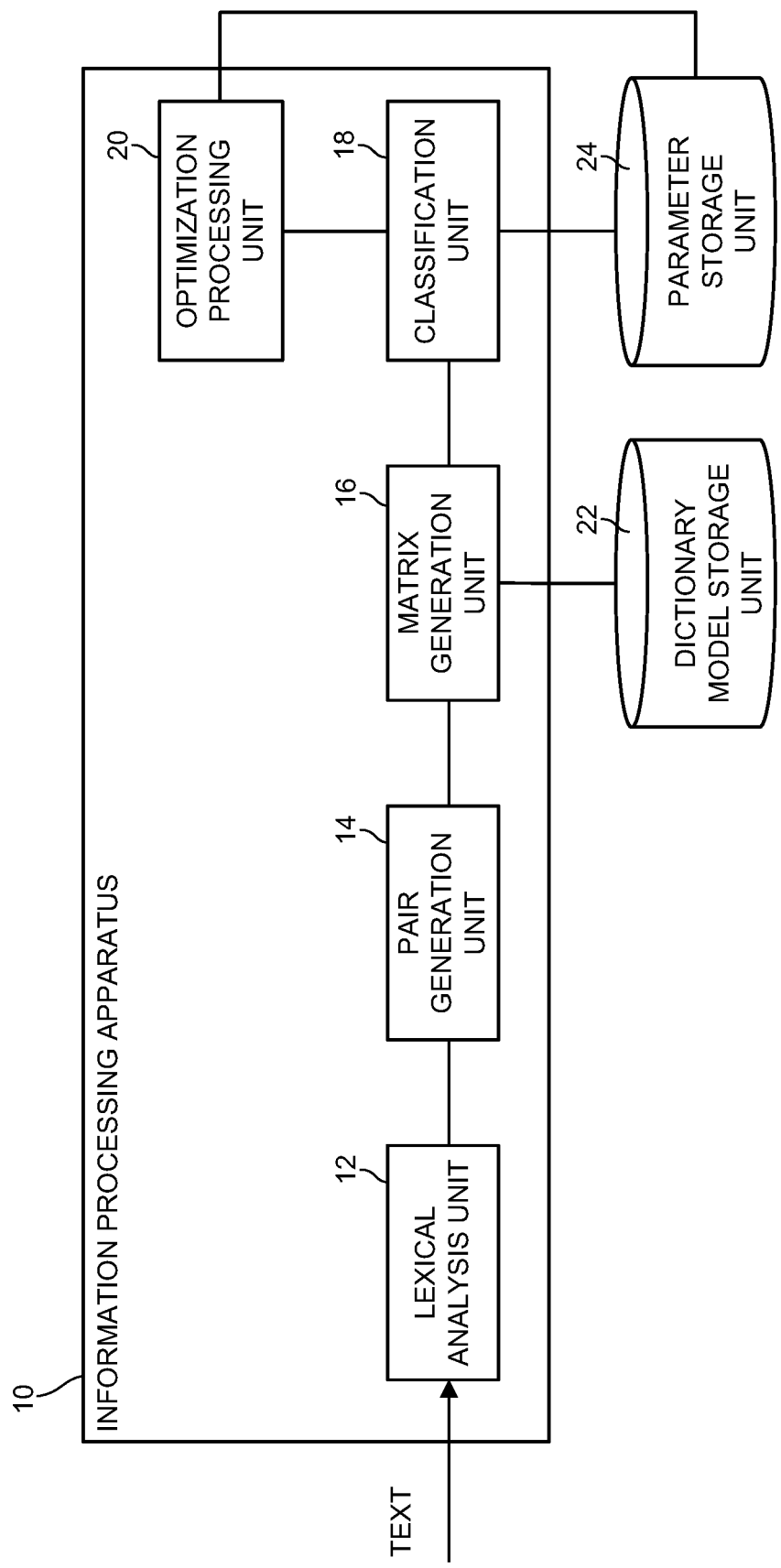
FIG. 5 is a block diagram specifically showing the configuration of the information processing apparatus according to the example embodiment of the invention.

Next, the specific configuration of the information processing apparatus will be described. FIG. 5 is a block diagram specifically showing the configuration of the information processing apparatus according to the example embodiment of the invention.

As shown in FIG. 5, in the example embodiment, the information processing apparatus 10 is further provided with a dictionary model storage unit 22 and a parameter storage unit 24, in addition to the abovementioned lexical analysis unit 12, pair generation unit 14, matrix generation unit 16, classification unit 18, and optimization processing unit 20. A dictionary model is stored in the dictionary model storage unit 22. In the example embodiment, a known dictionary model such as Word2vec is stored in the dictionary model storage unit 22. The parameters of a determination model built using a CNN are stored in the parameter storage unit 24. Note that, in the example embodiment, parameters for every event information are stored in the parameter storage unit 24, so as to be able to respond to a plurality of event information.

In the example embodiment, similarly to the conventional technology, a training text and position information of a specific word are first input to the lexical analysis unit 12, when learning a determination model. As mentioned above, the lexical analysis unit 12 generates the training word string 30 (refer to FIG. 2), by performing lexical analysis of the input training text. As mentioned above, position information and a label are assigned to each word of the training word string 30.

The pair generation unit 14, as mentioned above, extracts the plurality of training word pairs P1 to P4 (refer to FIG. 3) from the training word string 30.

In the example embodiment, the matrix generation unit 16 acquires the semantic vector V of each word of the training word string 30, using the dictionary model stored in the dictionary model storage unit 22.

The matrix generation unit 16 generates the plurality of training matrices M1 to M4, by associating the acquired semantic vector V of each word with each word of the plurality of training word pairs P1 to P4. Also, the classification unit 18 calculates, for a word of each position of the training word string 30, the probability of the word corresponding to the specific word, using the parameters of the determination model stored in the parameter storage unit 24. In the example embodiment, the classification unit 18 determines a word whose calculated probability is greater than or equal to a threshold value (e.g., 0.5) to be the specific word.

The optimization processing unit 20 updates (optimizes) the parameters stored in the parameter storage unit 24, such that the probability of the word labeled as corresponding to the specific word is high, among the probabilities of the words of the respective positions of the training word string 30 calculated by the classification unit 18. The determination model is thereby learned. Note that the optimization processing unit 20 is able to optimize the parameters with a known method. In the example embodiment, the optimization processing unit 20 updates the parameters, such that a loss function whose arguments are the parameters of the determination model is minimized, for example. Specifically, the optimization processing unit 20 is able to update the parameters using a gradient descent method that updates parameters in the opposite direction to the gradient direction of an objective function, for example.

Also, in the information processing apparatus 10 according to the example embodiment, the specific word is extracted from an analysis text, using the determination model learned in the above manner. Specifically, when an analysis text is provided to the lexical analysis unit 12, the lexical analysis unit 12 generates a word string (hereinafter, referred to as an analysis word string), by performing lexical analysis of the analysis text, similarly to when learning is performed. Note that each word of the analysis word string is assigned position information but is not assigned a label.

The pair generation unit 14 generates a plurality of analysis word pairs from the analysis word string, using the window W (refer to FIG. 2), similarly to when learning is performed.

The matrix generation unit 16 acquires the semantic vector of each word of the analysis word string, using the dictionary model stored in the dictionary model storage unit 22, similarly to when learning is performed. Also, the matrix generation unit 16 generates a plurality of analysis matrices, by associating the acquired semantic vector of each word with each word of the plurality of analysis word pairs, similarly to when learning is performed.

In the example embodiment, event information targeted for analysis is provided to the classification unit 18. The classification unit 18 calculates, for a word of each position of the analysis word string, the probability of the word corresponding to the specific word, using the parameters (parameters corresponding to the provided event information) of the determination model stored in the parameter storage unit 24, similarly to when learning is performed. In the example embodiment, the classification unit 18 determines a word whose calculated probability is greater than or equal to a threshold value (e.g., 0.5) to be the specific word. Also, the classification unit 18 extracts the word determined to be the specific word, and outputs the extracted word together with the position information.

Figure 6:
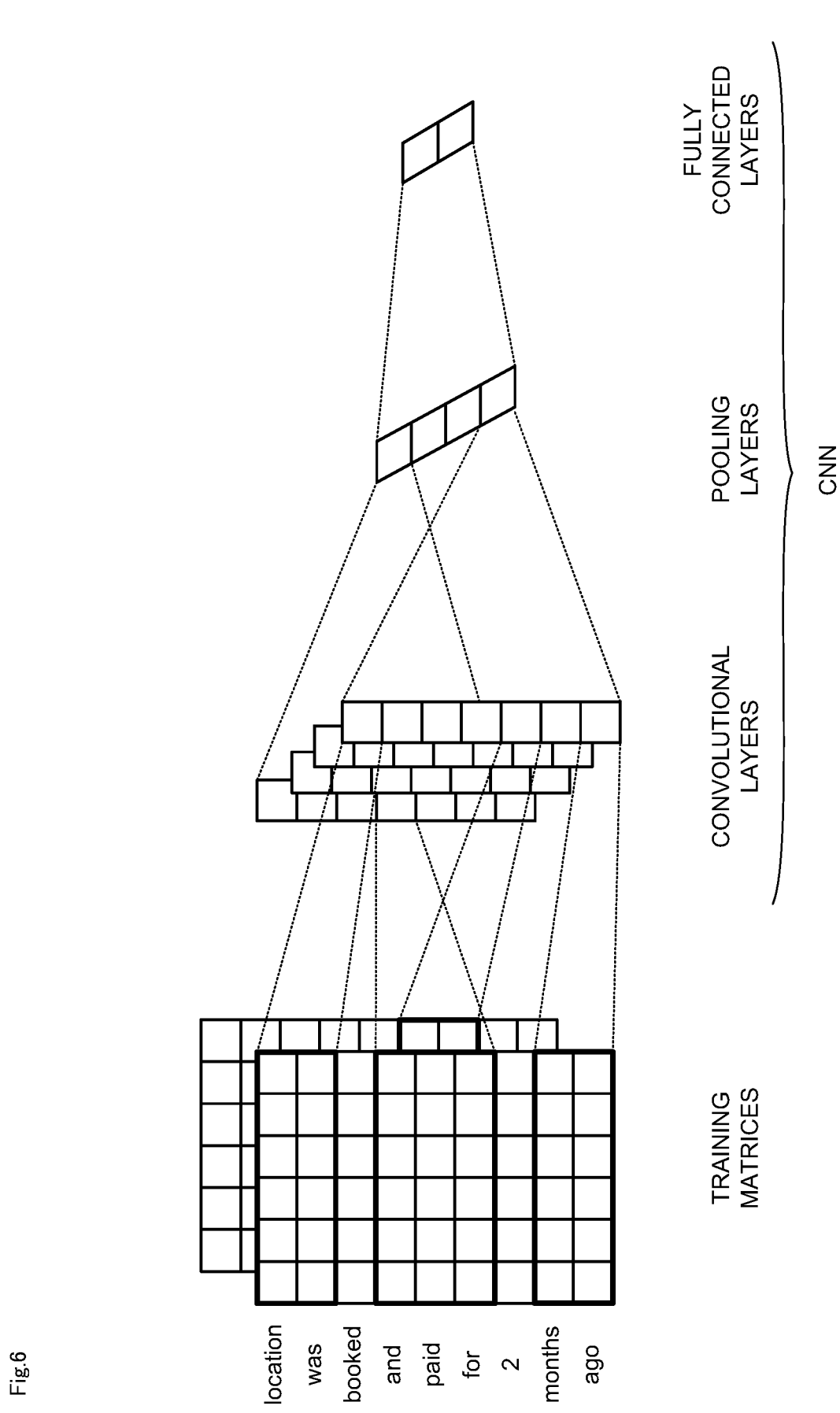
FIG. 6 is a conceptual diagram showing the contents of processing by a CNN.

Here, the contents of processing that uses a CNN will be briefly described. FIG. 6 is a conceptual diagram showing the contents of processing by a CNN that is conventionally utilized. Note that, in FIG. 6, training matrices generated with the length of the window W set to 9, in the extraction apparatus 100 (refer to FIG. 15) using the conventional technology, are shown. As shown in FIG. 6, the CNN includes convolutional layers, pooling layers, and fully connected layers. CNNs are a known technology, and thus a detailed description thereof will be omitted, although, in the example embodiment, similarly to the example shown in FIG. 6, a plurality of matrices generated by the matrix generation unit 16 are convoluted (compressed) using a filter.

Figure 7:
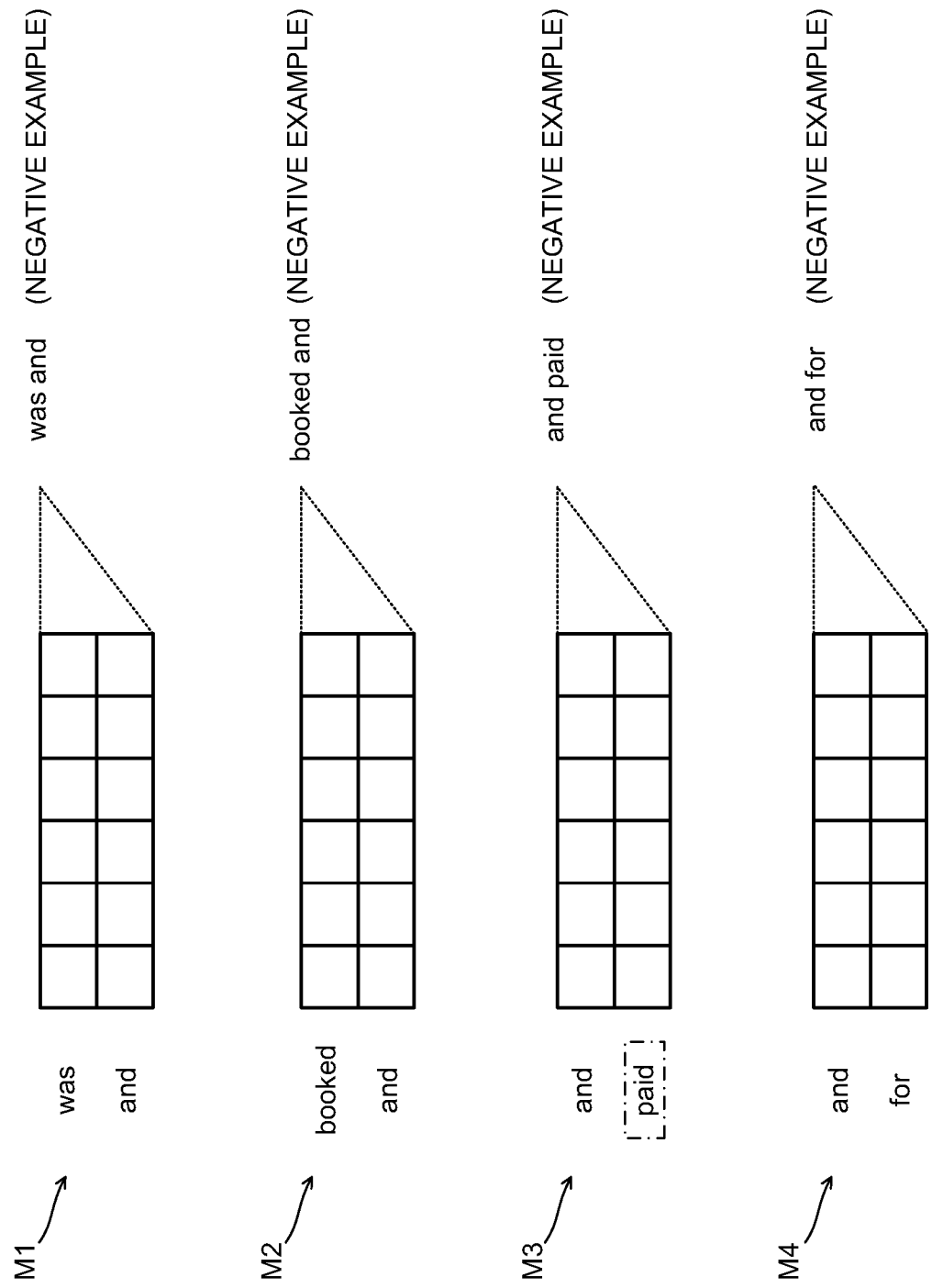
FIG. 7 is a diagram schematically showing the contents of processing at the time of training matrices being compressed by a CNN.
Figure 8:
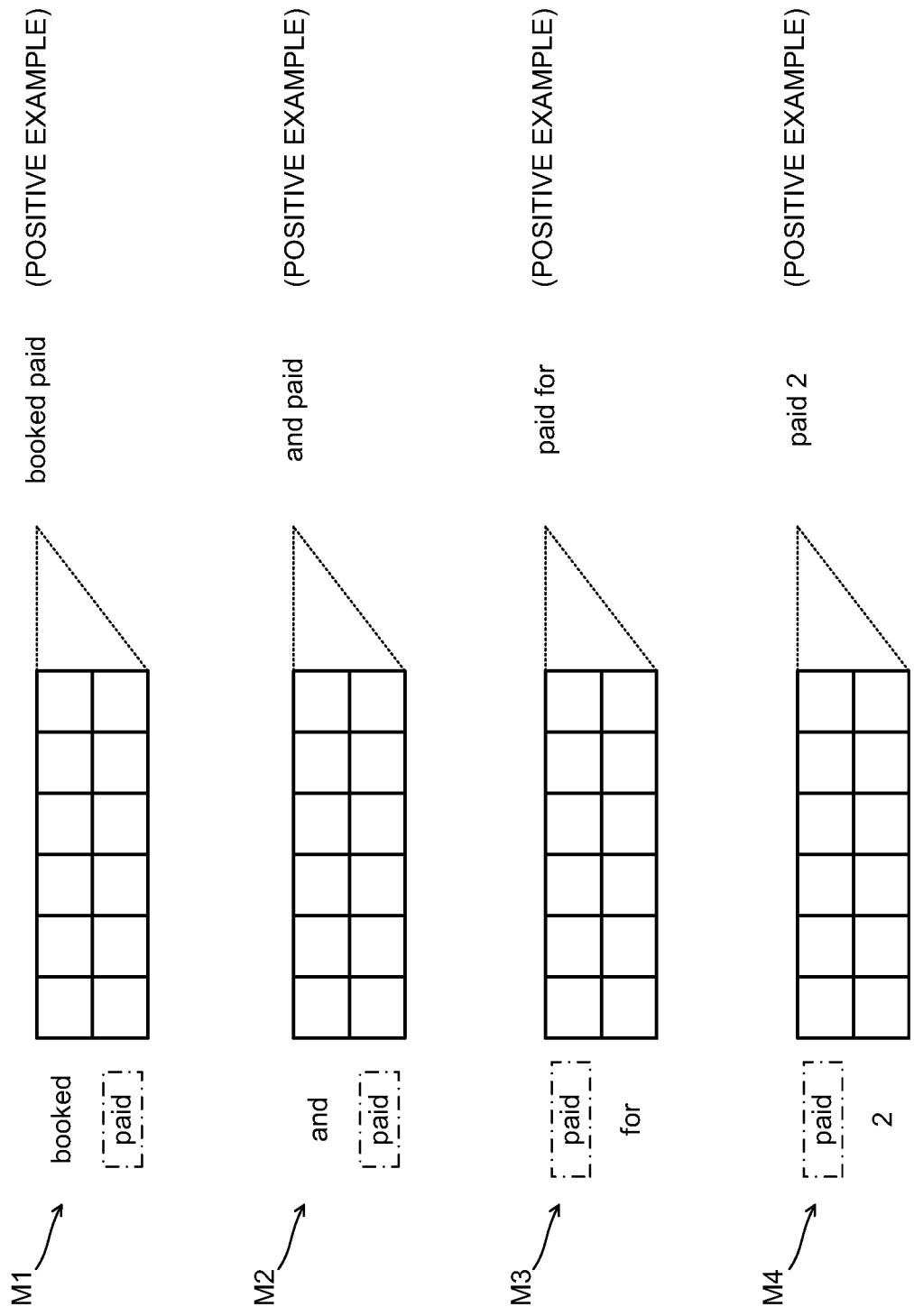
FIG. 8 is a diagram schematically showing the contents of processing at the time of training matrices being compressed by a CNN.

FIGS. 7 and 8 are diagrams schematically showing the contents of processing (convolutional processing) at the time when the training matrices M1 to M4 are compressed by the CNN. Note that the training matrices M1 to M4 shown in FIGS. 7 and 8 are matrices obtained from the training word pairs P1 to P4 generated using a window W whose length L is 5 (refer to FIG. 2). Also, FIGS. 7 and 8 show an example of convolutional processing in the case where the specific word is "paid" and the size (size represented by a word count) of the convolutional filter is 2. Also, FIG. 7 shows an example in the case where the word targeted for detection is "and", and FIG. 8 shows an example in the case where the word targeted for detection is "paid".

As shown in FIGS. 7 and 8, in the example embodiment, the classification unit 18, when performing convolutional processing at the time of learning, judges whether the word pair that has undergone convolutional processing is a "positive example" or a "negative example", based on the label given to each word. Specifically, all the training word pairs generated in the case where the word targeted for detection is not the specific word (refer to FIG. 7) are judged to be "negative examples". On the other hand, all the training word pairs generated in the case where the word targeted for detection is the specific word (refer to FIG. 8) are judged to be "positive examples". Accordingly, in the case where, for example, the plurality of training matrices M1 to M4 generated from each word of the training word string 30 shown in FIG. 2 are processed with a convolutional filter whose size is 2, the positive example count and the negative example count of the word pairs will be as shown in FIG. 9.

Here, viewing the training matrices M1 to M4 in FIGS. 7 and 8 as analysis matrices, the positive example count and the negative example count of the word pairs that have undergone convolutional processing will be as shown in FIG. 10, in the case where, at the time of analysis, the word targeted for detection is "and". In this case, the proportion (⅛) of the positive example count to the overall count is 0.125.

On the other hand, in the case where the word targeted for detection is "paid" (refer to FIG. 8), the positive example count and negative example count of the word pairs that have undergone convolutional processing will be as shown in FIG. 11. In this case, the proportion (4/8) of the positive example count to the overall count is 0.5.

From the above description, it is clear that, in the example embodiment, a determination model can be learned, such that the score is increased, in the case where the specific word is located in the middle of the window W (i.e., in the case where the specific word is the word targeted for detection).

Figure 19:
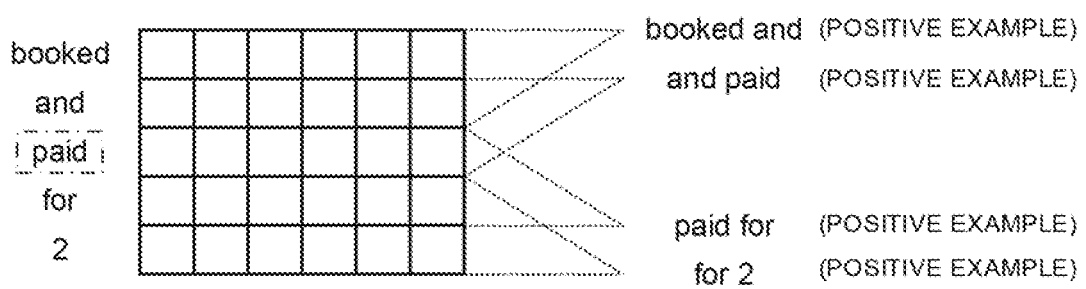
FIG. 19 is a diagram schematically showing the contents of processing at the time of a training matrix being compressed by a CNN.

In particular, in the example embodiment, in the case where, at the time of learning, the specific word is the word targeted for detection, the classification unit 18 judges all word pairs generated from the plurality of training matrices M1 to M4 to be "positive examples". For example, in the example in FIG. 8, all four word pairs that are judged to be "positive examples" in the classification unit 18 are word pairs containing the specific word. On the other hand, in the case where "paid" is the specific word and also the word targeted for detection in the extraction apparatus 100 of FIG. 15, the word pairs are judged to be "positive examples" and "negative examples", as shown in FIG. 19. Accordingly, in the classification unit 103 of the extraction apparatus 100, the number of word pairs that are judged to be "positive examples" is 4, and two word pairs ("and paid" and "paid for"), out of the four word pairs, will be word pairs containing the specific word. In this way, in the information processing apparatus 10 according to the example embodiment, the proportion of word pairs containing the specific word, out of the plurality of word pairs that are judged to be "positive examples" in the classification unit 18, can be increased, compared to an information processing apparatus (e.g., extraction apparatus 100 in FIG. 15) using the conventional technology.

Also, in the example embodiment, in the case where, at the time of analysis, the specific word is the word targeted for detection, the number of times that word pairs containing the specific word are input to the convolutional layers in the classification unit 18 can be increased to be greater than the number of times that word pairs not containing the specific word are input to the convolutional layers. For example, taking the training matrices M1 to M4 in FIG. 8 as analysis matrices, all four word pairs that are input to the convolutional layers in the classification unit 18, are word pairs containing the specific word. On the other hand, in the case where "paid" is the specific word and also the word targeted for detection in the extraction apparatus 100 of FIG. 15, two word pairs, out of the four word pairs that are input to the convolutional layers, will be word pairs containing the specific word, as shown in FIG. 19. In this way, with the information processing apparatus 10 according to the example embodiment, the number of times that word pairs containing the specific word are input to the convolutional layers can be increased, compared to an information processing apparatus (e.g., extraction apparatus 100 in FIG. 15) using the conventional technology. It thereby becomes possible to accurately specify the position of the specific word in the analysis text.

As described above, in the example embodiment, a specific word can be accurately extracted from the analysis text, by extracting a plurality of word pairs from within the window on the basis of the detection word.

[Apparatus Operations]

Figure 12:
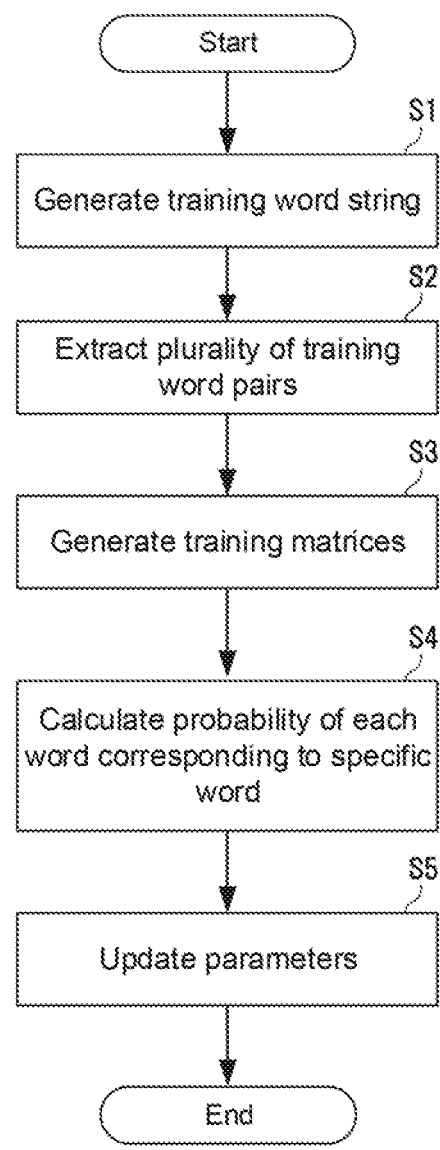
FIG. 12 is a flowchart showing operations of an information processing method according to the example embodiment of the invention.
Figure 13:
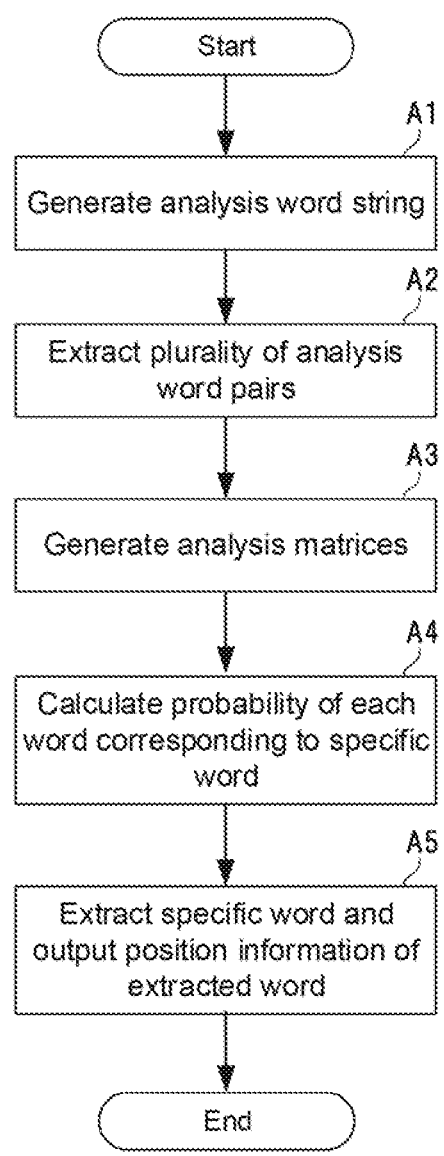
FIG. 13 is a flowchart showing operations of the information processing method according to the example embodiment of the invention.

Next, operations of the information processing apparatus 10 according to the example embodiment of the invention will be described using FIGS. 12 and 13. FIGS. 12 and 13 are flowcharts showing the operations of an information processing method according to the example embodiment of the invention. In the following description, FIGS. 1 to 11 will be taken into consideration as appropriate. Also, in the example embodiment, the information processing method is implemented by operating the information processing apparatus 10. Therefore, the following description of the operations of the information processing apparatus 10 will be given in place of a description of the information processing method according to the example embodiment.

First, the operations of the information processing apparatus 10 at the time of learning will be described. As shown in FIG. 12, first, the lexical analysis unit 12 generates a training word string, after acquiring a training text and position information of the specific word, as mentioned above (step S1).

Next, the pair generation unit 14 extracts a plurality of training word pairs from the training word string, as mentioned above (step S2). Next, the matrix generation unit 16 generates training matrices, as mentioned above (step S3).

Next, the classification unit 18 calculates the probability of each word of the training word string corresponding to the specific word, as mentioned above (step S4).

Finally, the optimization processing unit 20 updates the parameters of the determination model, as mentioned above (step S5).

Next, operations of the information processing apparatus 10 at the time of analysis will be described. As shown in FIG. 13, first, the lexical analysis unit 12 generates an analysis word string, after acquiring an analysis text, as mentioned above (step A1). Next, the pair generation unit 14 extracts a plurality of analysis word pairs from the analysis word string, as mentioned above (step A2). Next, the matrix generation unit 16 generates analysis matrices, as mentioned above (step A3). Next, the classification unit 18 calculates the probability of each word of the analysis word string corresponding to the specific word, as mentioned above (step A4).

Finally, the classification unit 18 extracts the specific word from the analysis word string, and outputs the position information of the extracted word, as mentioned above (step A5).

[Program]

The program according to the example embodiment need only be a program that causes a computer to execute steps S1 to S5 shown in FIG. 12 and steps A1 to A5 shown in FIG. 13. The information processing apparatus and the information processing method according to the example embodiment can be realized, by this program being installed on a computer and executed. In this case, a processor of the computer performs processing, while functioning as the lexical analysis unit 12, the pair generation unit 14, the matrix generation unit 16, the classification unit 18, and the optimization processing unit 20.

Also, in the example embodiment, the dictionary model storage unit 22 and the parameter storage unit 24 are realized by storing a data file constituting these constituent elements in a storage device such as a hard disk provided in the computer, or by loading a recording medium on which this data file is stored in a reading device connected to the computer.

Also, the program according to the example embodiment may be executed by a computer system built from a plurality of computers. In this case, for example, the computers may respectively function as one of the lexical analysis unit 12, the pair generation unit 14, the matrix generation unit 16, the classification unit 18, and the optimization processing unit 20. Also, the dictionary model storage unit 22 and the parameter storage unit 24 may be built on a different computer from the computer that executes the program according to the example embodiment.

[Physical Configuration]

Here, a computer that realizes an information processing apparatus by executing the program according to the example embodiment will be described using FIG. 14.

Figure 14:
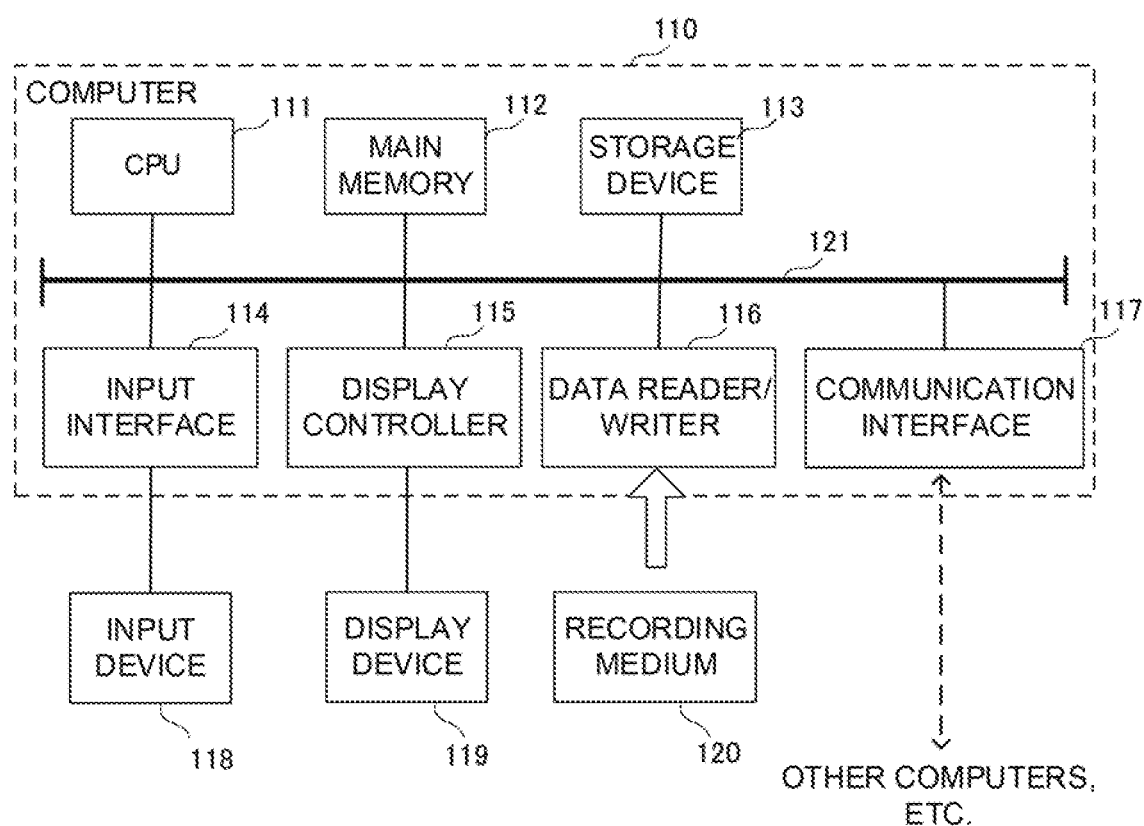
FIG. 14 is a block diagram showing an example of a computer that realizes the information processing apparatus according to the example embodiment of the invention.
Figure 15:
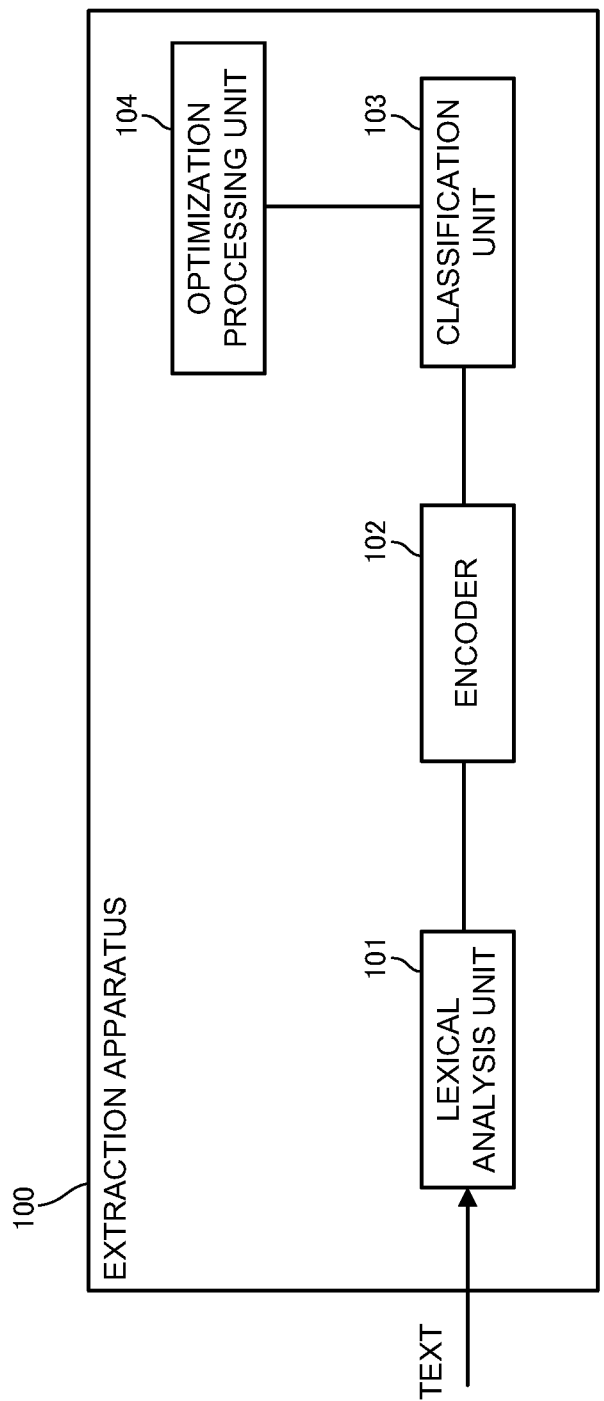
FIG. 15 is a block diagram showing the configuration of an extraction apparatus that utilizes the method of Non-Patent Document 1.

FIG. 14 is a block diagram showing an example of a computer that realizes the information processing apparatus 10 according to the example embodiment of the invention.

As shown in FIG. 14, a computer 110 includes a CPU 111, a main memory 112, a storage device 113, an input interface 114, a display controller 115, a data reader/writer 116, and a communication interface 117. These units are connected in a manner that enables data communication therebetween, via a bus 121. Note that the computer 110 may include a GPU (Graphics Processing Unit) or an FPGA (Field-Programmable Gate Array), in addition to the CPU 111 or instead of the CPU 111.

The CPU 111 implements various computational operations, by extracting programs (code) according to the example embodiment that are stored in the storage device 113 in the main memory 112, and executing these programs in predetermined order. The main memory 112, typically, is a volatile storage device such as a DRAM (Dynamic Random Access Memory). Also, programs according to the example embodiment are provided in a state of being stored on a computer-readable recording medium 120. Note that programs according to the example embodiment may be distributed over the Internet connected via the communication interface 117.

Also, a semiconductor storage device such as a flash memory is given as a specific example of the storage device 113, other than a hard disk drive. The input interface 114 mediates data transmission between the CPU 111 and input devices 118 such as a keyboard and a mouse. The display controller 115 is connected to a display device 119 and controls display by the display device 119.

The data reader/writer 116 mediates data transmission between the CPU 111 and the recording medium 120, and executes readout of programs from the recording medium 120 and writing of processing results of the computer 110 to the recording medium 120. The communication interface 117 mediates data transmission between the CPU 111 and other computers.

Also, a general-purpose semiconductor storage device such as a CF (Compact Flash (registered trademark)) card or an SD (Secure Digital) card, a magnetic recording medium such as a flexible disk, and an optical recording medium such as a CD-ROM (Compact Disk Read Only Memory) are given as specific examples of the recording medium 120.

Note that the information processing apparatus 10 according to the example embodiment is also realizable by using hardware corresponding to the respective units, rather than by a computer on which programs are installed. Furthermore, the information processing apparatus 10 may be realized in part by programs, and the remaining portion may be realized by hardware.

The example embodiment described above can be partially or wholly realized by supplementary notes 1 to 12 described below, but the invention is not limited to the following description.

(Supplementary Note 1)

An information processing apparatus including:

a lexical analysis unit configured to acquire a training text and position information indicating a position, in the training text, of a word relating to specific event information, and generate a training word string given, for every word, position information indicating a position of the word in the training text and a label indicating whether the word corresponds to the word relating to the event information, by performing lexical analysis of the training text;

a pair generation unit configured, while shifting, one word at a time from a head to an end of the training word string generated by the lexical analysis unit, a position of a window of a predetermined length centering on a word targeted for detection, in the training word string, to extract a plurality of training word pairs obtained by respectively combining each word other than the word targeted for detection within the window in each position with the word targeted for detection;

a matrix generation unit configured, by associating a semantic vector of each of the plurality of words of the training word string, generated using a dictionary model set in advance, with each word of the plurality of training word pairs, to generate, for each of the plurality of training word pairs, a training matrix in which each word and the semantic vector of the word are associated;

a classification unit configured to calculate, for a word of each position of the training word string, a probability of the word corresponding to the word relating to the specific event information, using the plurality of training matrices generated by the matrix generation unit and a determination model that uses a convolutional neural network; and an optimization processing unit configured to update a parameter of the determination model, such that the probability of the word labeled as corresponding to the word relating to the event information is high, among the probabilities of words of the respective positions of the training word string calculated by the classification unit.

(Supplementary Note 2)

The information processing apparatus according to supplementary note 1, in which a length of the window indicated by a word count is set to an odd number of 5 or more.

(Supplementary Note 3)

The information processing apparatus according to supplementary note 1 or 2, in which the lexical analysis unit is configured to acquire an analysis text targeted for analysis, and generate an analysis word string given, for every word, position information indicating a position of the word in the analysis text, by performing lexical analysis of the analysis text;

the pair generation unit is configured, while shifting, one word at a time from a head to an end of the analysis word string generated by the lexical analysis unit, the position of the window of the predetermined length, in the analysis word string, to extract a plurality of analysis word pairs obtained by respectively combining each word other than the word targeted for detection within the window in each position with the word targeted for detection;

the matrix generation unit is configured, by associating a semantic vector of each of the plurality of words of the analysis word string, generated using the dictionary model, with each word of the plurality of analysis word pairs, to generate, for each of the plurality of analysis word pairs, an analysis matrix in which each word and the semantic vector of the word are associated; and the classification unit is configured to calculate, for a word of each position of the analysis word string, a probability of the word corresponding to the word relating to the specific event information, using the plurality of analysis matrices generated by the matrix generation unit and the determination model.

(Supplementary Note 4)

The information processing apparatus according to supplementary note 3, in which the classification unit is configured to extract, as the word of the specific event information, a word whose calculated probability is greater than or equal to a threshold value, among the plurality of words of the analysis word string, and to output the position information of the extracted word.

(Supplementary Note 5)

An information processing method including:

(a) a step of acquiring a training text and position information indicating a position, in the training text, of a word relating to specific event information, and generating a training word string given, for every word, position information indicating a position of the word in the training text and a label indicating whether the word corresponds to the word relating to the event information, by performing lexical analysis of the training text;

(b) a step of extracting a plurality of training word pairs obtained by respectively combining each word other than the word targeted for detection with the word targeted for detection within a window of a predetermined length centering on a word targeted for detection in each position, while shifting, one word at a time from a head to an end of the training word string generated in the (a) step, a position of the window, in the training word string;

(c) a step of generating, for each of the plurality of training word pairs, a training matrix in which each word and a semantic vector of the word are associated, by associating the semantic vector of each of a plurality of words of the training word string, generated using a dictionary model set in advance, with each word of the plurality of training word pairs;

(d) a step of calculating, for a word of each position of the training word string, a probability of the word corresponding to the word relating to the specific event information, using the plurality of training matrices generated in the (c) step and a determination model that uses a convolutional neural network; and (e) a step of updating a parameter of the determination model, such that the probability of the word labeled as corresponding to the word relating to the event information is high, among the probabilities of words of the respective positions of the training word string calculated in the (d) step.

(Supplementary Note 6)

The information processing method according to supplementary note 5, in which a length of the window indicated by a word count is set to an odd number of 5 or more.

(Supplementary Note 7)

(f) a step of acquiring an analysis text targeted for analysis, and generating an analysis word string given, for every word, position information indicating a position of the word in the analysis text, by performing lexical analysis of the analysis text;

(g) a step of extracting a plurality of analysis word pairs obtained by respectively combining each word other than the word targeted for detection with the word targeted for detection within a window of the predetermined length in each position, while shifting, one word at a time from a head to an end of the analysis word string, the position of the window, in the analysis word string generated in the (f) step;

(h) a step of generating, for each of the plurality of analysis word pairs, an analysis matrix in which each word and a semantic vector of the word are associated, by associating the semantic vector of each of a plurality of words of the analysis word string, generated using the dictionary model, with each word of the plurality of analysis word pairs; and (i) a step of calculating, for a word of each position of the analysis word string, a probability of the word corresponding to the word relating to the specific event information, using the plurality of analysis matrices generated in the (h) step and the determination model.

(Supplementary Note 8)

The information processing method according to supplementary note 7, in which, in the (i) step, a word whose calculated probability is greater than or equal to a threshold value, among the plurality of words of the analysis word string, is extracted as the word of the specific event information, and the position information of the extracted word is output.

(Supplementary Note 9)

A computer-readable recording medium that includes a program recorded thereon, the program including instructions that cause a computer to carry out:

(a) a step of acquiring a training text and position information indicating a position, in the training text, of a word relating to specific event information, and generating a training word string given, for every word, position information indicating a position of the word in the training text and a label indicating whether the word corresponds to the word relating to the event information, by performing lexical analysis of the training text;

(b) a step of extracting a plurality of training word pairs obtained by respectively combining each word other than the word targeted for detection with the word targeted for detection within a window of a predetermined length centering on a word targeted for detection in each position, while shifting, one word at a time from a head to an end of the training word string generated in the (a) step, a position of the window, in the training word string;

(c) a step of generating, for each of the plurality of training word pairs, a training matrix in which each word and a semantic vector of the word are associated, by associating the semantic vector of each of a plurality of words of the training word string, generated using a dictionary model set in advance, with each word of the plurality of training word pairs;

(d) a step of calculating, for a word of each position of the training word string, a probability of the word corresponding to the word relating to the specific event information, using the plurality of training matrices generated in the (c) step and a determination model that uses a convolutional neural network; and (e) a step of updating a parameter of the determination model, such that the probability of the word labeled as corresponding to the word relating to the event information is high, among the probabilities of words of the respective positions of the training word string calculated in the (d) step.

(Supplementary Note 10)

The computer-readable recording medium according to supplementary note 9, in which a length of the window indicated by a word count is set to an odd number of 5 or more.

(Supplementary Note 11)

The computer-readable recording medium according to supplementary note 9 or 10, in which the program further includes instructions that cause the computer to carry out:

(f) a step of acquiring an analysis text targeted for analysis, and generating an analysis word string given, for every word, position information indicating a position of the word in the analysis text, by performing lexical analysis of the analysis text;

(g) a step of extracting a plurality of analysis word pairs obtained by respectively combining each word other than the word targeted for detection with the word targeted for detection within a window of the predetermined length in each position, while shifting, one word at a time from a head to an end of the analysis word string, the position of the window, in the analysis word string generated in the (f) step;

(h) a step of generating, for each of the plurality of analysis word pairs, an analysis matrix in which each word and a semantic vector of the word are associated, by associating the semantic vector of each of a plurality of words of the analysis word string, generated using the dictionary model, with each word of the plurality of analysis word pairs; and (i) a step of calculating, for a word of each position of the analysis word string, a probability of the word corresponding to the word relating to the specific event information, using the plurality of analysis matrices generated in the (h) step and the determination model.

(Supplementary Note 12)

The computer-readable recording medium according to supplementary note 11, in which, in the (i) step, a word whose calculated probability is greater than or equal to a threshold value, among the plurality of words of the analysis word string, is extracted as the word of the specific event information, and the position information of the extracted word is output.

Although the invention of the present application has been described above with reference to an example embodiment, the invention is not limited to the example embodiment described above. Various modifications apparent to those skilled in the art can be made to the configurations and details of the invention within the scope of the invention.

INDUSTRIAL APPLICABILITY

As described above, according to the invention, words relating to specific event information can be accurately extracted from a provided text.

LIST OF REFERENCE SIGNS

10 Information processing apparatus
12 Lexical analysis unit
14 Pair generation unit
16 Matrix generation unit
18 Classification unit
20 Optimization processing unit
22 Dictionary model storage unit
24 Parameter storage unit
110 Computer
111 CPU
112 Main memory
113 Storage device
114 Input interface
115 Display controller
116 Data reader/writer
117 Communication interface
118 Input device
119 display device
120 Recording medium
121 Bus

What is claimed is:

1. An information processing apparatus comprising:
a lexical analysis circuit configured to acquire a training text and position information indicating a position, in the training text, of a word relating to specific event information, and generate a training word string given, for every word, position information indicating a position of the word in the training text and a label indicating whether the word corresponds to the word relating to the event information, by performing lexical analysis of the training text;
a pair generation circuit configured, while shifting, one word at a time from a head to an end of the training word string generated by the lexical analysis circuit, a position of a window of a predetermined length centering on a word targeted for detection, in the training word string, to extract a plurality of training word pairs obtained by respectively combining each word other than the word targeted for detection within the window in each position with the word targeted for detection;

a matrix generation circuit configured, by associating a semantic vector of each of the plurality of words of the training word string, generated using a dictionary model set in advance, with each word of the plurality of training word pairs, to generate, for each of the plurality of training word pairs, a training matrix in which each word and the semantic vector of the word are associated;

a classification circuit configured to calculate, for a word of each position of the training word string, a probability of the word corresponding to the word relating to the specific event information, using the plurality of training matrices generated by the matrix generation circuit and a determination model that uses a convolutional neural network; and an optimization processing circuit configured, the probability being included in a plurality of probabilities, to update a parameter of the determination model, such that the probability of the word labeled as corresponding to the word relating to the event information is high, among the plurality of probabilities of words of respective positions of the training word string calculated by the classification circuit.

2. The information processing apparatus according to claim 1,
wherein a length of the window indicated by a word count is set to an odd number of 5 or more.

3. The information processing apparatus according to claim 1,
wherein the lexical analysis circuit is configured to acquire an analysis text targeted for analysis, and generate an analysis word string given, for every word, position information indicating a position of the word in the analysis text, by performing lexical analysis of the analysis text;
the pair generation circuit is configured, while shifting, one word at a time from a head to an end of the analysis word string generated by the lexical analysis circuit, the position of the window of the predetermined length, in the analysis word string, to extract a plurality of analysis word pairs obtained by respectively combining each word other than the word targeted for detection within the window in each position with the word targeted for detection;
the matrix generation circuit is configured, by associating a semantic vector of each of the plurality of words of the analysis word string, generated using the dictionary model, with each word of the plurality of analysis word pairs, to generate, for each of the plurality of analysis word pairs, a plurality of analysis matrices in which each word and the semantic vector of the word are associated; and
the classification circuit is configured to calculate, for a word of each position of the analysis word string, a probability of the word corresponding to the word relating to the specific event information, using the plurality of analysis matrices generated by the matrix generation circuit and the determination model.

4. The information processing apparatus according to claim 3,
wherein the classification circuit is configured to extract, as the word of the specific event information, a word whose calculated probability is greater than or equal to a threshold value, among the plurality of words of the analysis word string, and to output the position information of the extracted word.

5. An information processing method comprising:
acquiring a training text and position information indicating a position, in the training text, of a word relating to specific event information, and generating a training word string given, for every word, position information indicating a position of the word in the training text and a label indicating whether the word corresponds to the word relating to the event information, by performing lexical analysis of the training text;
extracting a plurality of training word pairs obtained by respectively combining each word other than the word targeted for detection with the word targeted for detection within a window of a predetermined length centering on a word targeted for detection in each position, while shifting, one word at a time from a head to an end of the training word string, a position of the window, in the training word string;
generating, for each of the plurality of training word pairs, a plurality of training matrices in which each word and a semantic vector of the word are associated, by associating the semantic vector of each of a plurality of words of the training word string, generated using a dictionary model set in advance, with each word of the plurality of training word pairs;
calculating, for a word of each position of the training word string, a probability of the word corresponding to the word relating to the specific event information, using the plurality of training matrices and a determination model that uses a convolutional neural network; and
updating, the probability being included in a plurality of probabilities, a parameter of the determination model, such that the probability of the word labeled as corresponding to the word relating to the event information is high, among the plurality of probabilities of words of the respective positions of the training word string.

6. The information processing method according to claim 5,
wherein a length of the window indicated by a word count is set to an odd number of 5 or more.

7. The information processing method according to claim 5, further comprising:
acquiring an analysis text targeted for analysis, and generating an analysis word string given, for every word, position information indicating a position of the word in the analysis text, by performing lexical analysis of the analysis text;
extracting a plurality of analysis word pairs obtained by respectively combining each word other than the word targeted for detection with the word targeted for detection within a window of the predetermined length in each position, while shifting, one word at a time from a head to an end of the analysis word string, the position of the window, in the analysis word string;
generating, for each of the plurality of analysis word pairs, a plurality of analysis matrices in which each word and a semantic vector of the word are associated, by associating the semantic vector of each of a plurality of words of the analysis word string, generated using the dictionary model, with each word of the plurality of analysis word pairs; and
calculating, for a word of each position of the analysis word string, a probability of the word corresponding to the word relating to the specific event information, using the plurality of analysis matrices and the determination model.

8. The information processing method according to claim 7,
wherein, when the probability is calculated, a word whose calculated probability is greater than or equal to a threshold value, among the plurality of words of the analysis word string, is extracted as the word of the specific event information, and the position information of the extracted word is output.

9. A non-transitory computer-readable recording medium that includes a program recorded thereon, the program including instructions that cause a computer to carry out:
acquiring a training text and position information indicating a position, in the training text, of a word relating to specific event information, and generating a training word string given, for every word, position information indicating a position of the word in the training text and a label indicating whether the word corresponds to the word relating to the event information, by performing lexical analysis of the training text;
extracting a plurality of training word pairs obtained by respectively combining each word other than the word targeted for detection with the word targeted for detection within a window of a predetermined length centering on a word targeted for detection in each position, while shifting, one word at a time from a head to an end of the training word string, a position of the window, in the training word string;
generating, for each of the plurality of training word pairs, a plurality of training matrices in which each word and a semantic vector of the word are associated, by associating the semantic vector of each of a plurality of words of the training word string, generated using a dictionary model set in advance, with each word of the plurality of training word pairs;
calculating, for a word of each position of the training word string, a probability of the word corresponding to the word relating to the specific event information, using the plurality of training matrices and a determination model that uses a convolutional neural network; and
updating, the probability being included in a plurality of probabilities, a parameter of the determination model, such that the probability of the word labeled as corresponding to the word relating to the event information is high, among the plurality of probabilities of words of the respective positions of the training word string.

10. The non-transitory computer-readable recording medium according to claim 9,
wherein a length of the window indicated by a word count is set to an odd number of 5 or more.

11. The non-transitory computer-readable recording medium according to claim 9,
wherein the program further includes instructions that cause the computer to carry out:
acquiring an analysis text targeted for analysis, and generating an analysis word string given, for every word, position information indicating a position of the word in the analysis text, by performing lexical analysis of the analysis text;
extracting a plurality of analysis word pairs obtained by respectively combining each word other than the word targeted for detection with the word targeted for detection within a window of the predetermined length in each position, while shifting, one word at a time from a head to an end of the analysis word string, the position of the window, in the analysis word string;
generating, for each of the plurality of analysis word pairs, a plurality of analysis matrices in which each word and a semantic vector of the word are associated, by associating the semantic vector of each of a plurality of words of the analysis word string, generated using the dictionary model, with each word of the plurality of analysis word pairs; and
calculating, for a word of each position of the analysis word string, a probability of the word corresponding to the word relating to the specific event information, using the plurality of analysis matrices and the determination model.

12. The non-transitory computer-readable recording medium according to claim 11,
wherein, when the probability is calculated, a word whose calculated probability is greater than or equal to a threshold value, among the plurality of words of the analysis word string, is extracted as the word of the specific event information, and the position information of the extracted word is output.

* * * * *